United States Patent [19]
Vinarcsik et al.

[11] 3,853,214
[45] Dec. 10, 1974

[54] CONVEYOR ROLLER STRUCTURE
[75] Inventors: Joseph E. Vinarcsik, Homewood; John A. Jachim, Chicago, both of Ill.
[73] Assignee: Hi-Hard Rolls, Inc., Harvey, Ill.
[22] Filed: Apr. 23, 1973
[21] Appl. No.: 353,292

[52] U.S. Cl. .............................. 198/127 R, 29/115
[51] Int. Cl. ............................................ B65g 13/04
[58] Field of Search ...... 29/115; 193/37; 198/127 R

[56] References Cited
UNITED STATES PATENTS

| | | | |
|---|---|---|---|
| 1,748,473 | 2/1930 | Fisk | 198/127 R |
| 2,317,742 | 4/1943 | Donbeck et al. | 193/37 |
| 2,602,536 | 7/1952 | Eggleston | 198/127 R |
| 2,712,377 | 7/1955 | Eggleston | 198/127 R |

Primary Examiner—Evon C. Blunk
Assistant Examiner—W. Scott Carson
Attorney, Agent, or Firm—Olson, Trexler, Wolters, Bushnell & Fosse, Ltd.

[57] ABSTRACT

The embodiment of the invention disclosed herein is directed to a conveyor roller structure wherein the outer working sleeve portion of the roller is secured to a reusable drive shaft by means of a collar having a non-circular rotational-restricting surface welded to the sleeve at one end of the drive shaft. When the surface of the outer working sleeve of the roller is excessively worn it can be replaced by cutting the collar loose with a cutting torch and sliding the sleeve from the drive shaft. A new sleeve and collar are placed on the drive shaft and secured thereto, thereby allowing a substantial portion of the conveyor roller structure to be used again.

5 Claims, 6 Drawing Figures

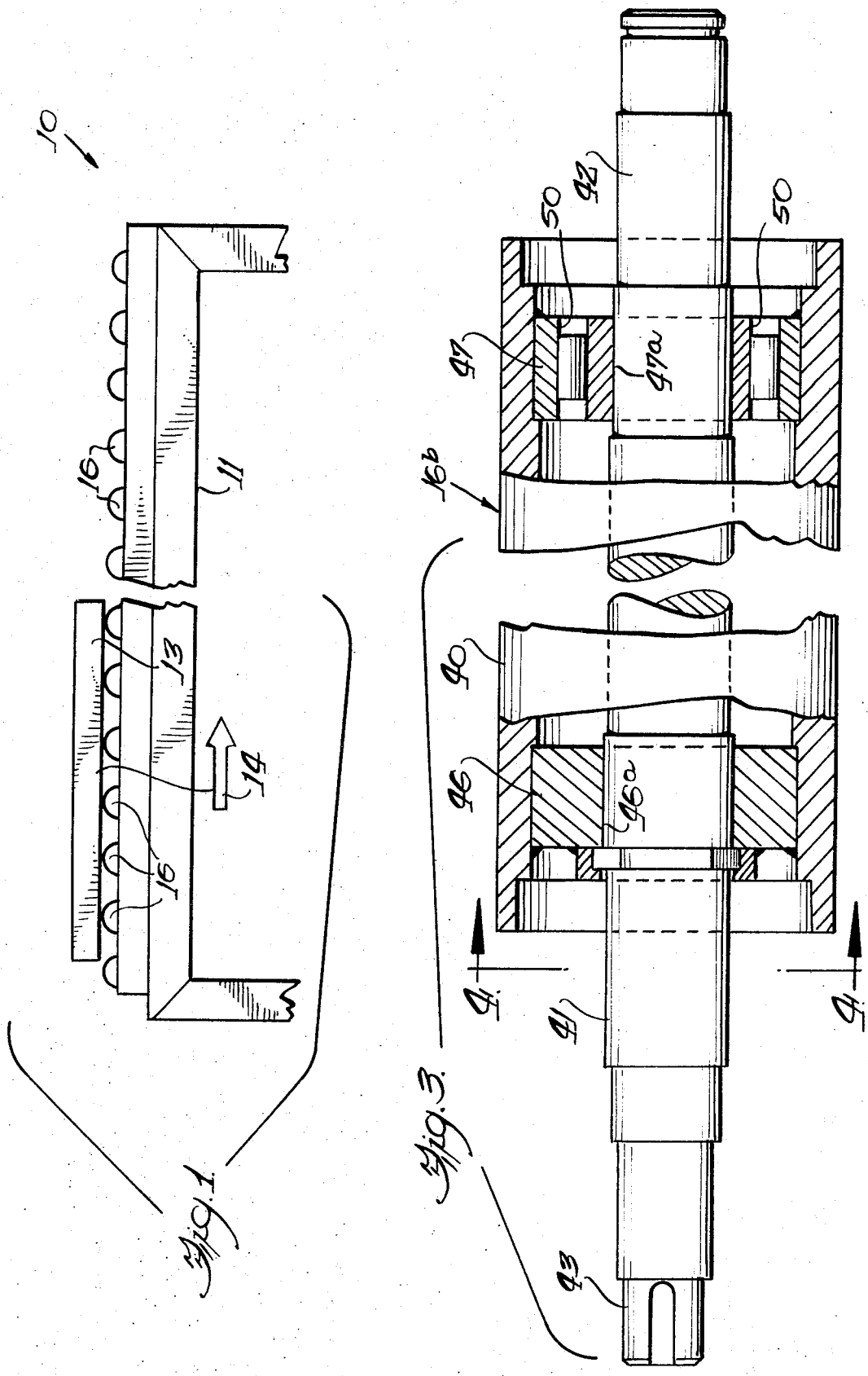

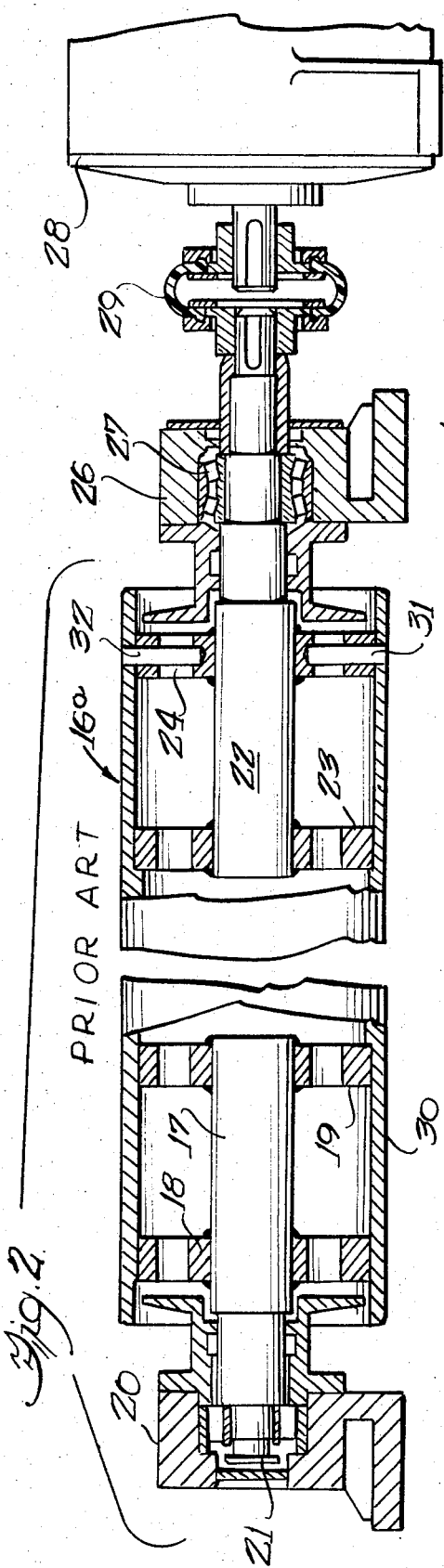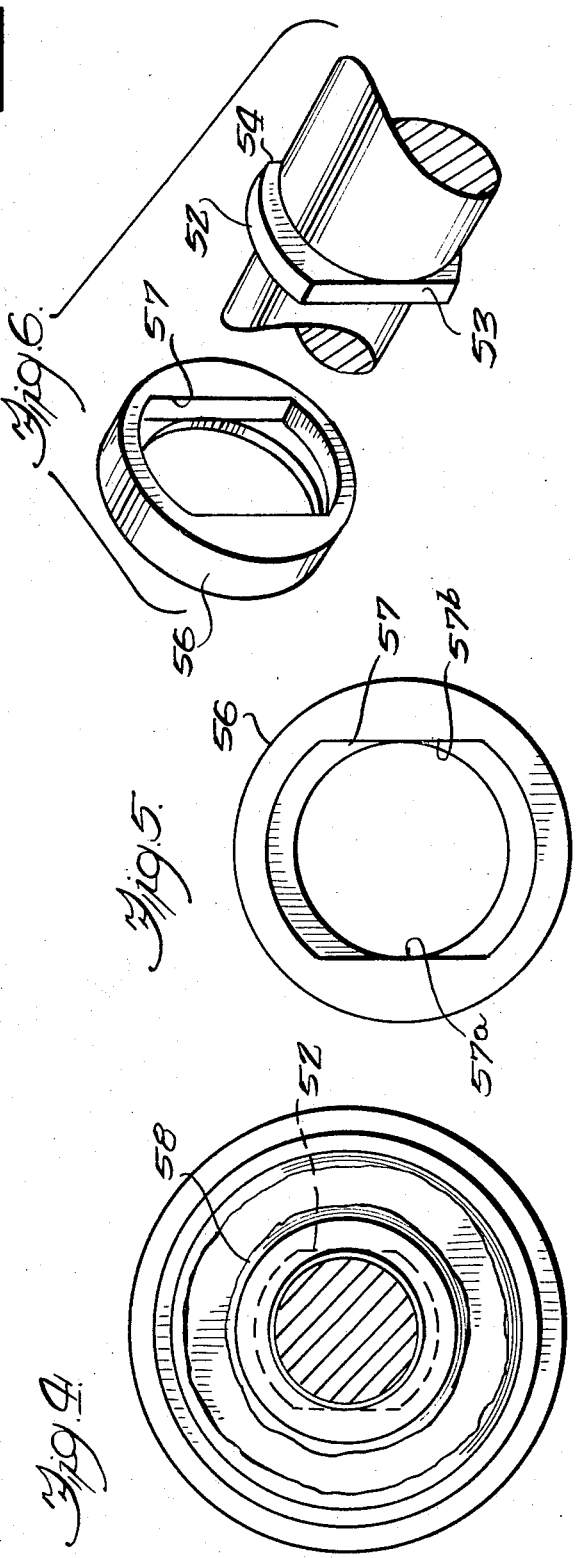

CONVEYOR ROLLER STRUCTURE

BACKGROUND OF THE INVENTION

This invention relates generally to conveyor roller structures, and more particularly to conveyor roller structures which can have the outer sleeve portion thereof replaced to increase the usable life of the roller.

During operation of a conveyor roller structure heavy loads may be accelerated and decelerated upon the conveyor rollers. Because of this acceleration and deceleration of the conveyor rollers, the outer sleeves thereof, which is the primary wear surface, are preferably made to be replaced when excessively worn.

In prior art roller structures of this type, the outer sleeves are pinned or staked to a central rotatable shaft. However, many times the pin causes elongation of the aperture through which the pin passes thereby causing loosening of the connection between the outer sleeve and the flange or shaft upon which it is secured. When this happens it often requires premature replacement of the roller shell upon the rest of the roller structure.

SUMMARY OF THE INVENTION

Accordingly, it is an object of this invention to provide an improved conveyor roller structure which allows replacement of the outer shell upon the drive shaft thereof, but which replacement is not prematurely necessary as a result of failure of the fastening mechanism.

Many other objects, features, and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a somewhat diagrammatic elevational view of a conveyor roller structure wherein the roller construction of this invention can be used;

FIG. 2 is an elevational sectional view of a hot strip run-out table roll constructed in accordance with the prior art;

FIG. 3 is an elevational sectional view of a hot strip run-out table roll constructed in accordance with this invention;

FIG. 4 is an end view taken along section line 4—4 of FIG. 3;

FIG. 5 is an end view showing the details of a non-circular rotational-restricting surface means formed at the end of the drive shaft; and FIG. 6 is a perspective view showing the cooperation between the non-circular rotational-restricting surface means and a cooperating collar.

DETAILED DESCRIPTION OF THE ILLUSTRATED EMBODIMENT

Referring now to FIG. 1 there is seen a conveyor roller structure designated generally by reference numeral 10. The conveyor roller structure 10 includes a lower table portion 11 rotatably supporting a plurality of table rollers 16. The conveyor can be used for any suitable means, here being illustrated for purposes of transporting heavy loads such as iron or steel members 13. The direction of travel of material on the conveyor structure 10 is indicated by the arrow 14 in which direction excessive force due to acceleration of the heavy load can be exerted.

FIG. 2 is an elevational view of a prior art hot table roll and is designated generally by reference numeral 16a. The roll 16a is provided with a stub shaft 17 at one end thereof, and the stub shaft 17 has extending radially outwardly therefrom a pair of flanges 18 and 19. The flanges 18 and 19 are welded to the stub shaft to become an integral part therewith. The stub shaft 17 is journaled in a side rail portion 20 by means of a bearing structure 21. The support rail 20 forms the side rails of the roller conveyor table. Positioned at the other end of the roller 16a is a drive shaft 22 which has a pair of flanges 23 and 24 extending radially outwardly therefrom and is an integral part of the drive shaft. The drive shaft 22 is journaled in a support rail 26 by means of a bearing structure 27. Coupling of the drive shaft 22 to a drive motor 28 is accomplished through a coupling unit 29, it being understood that any suitable coupling between the drive motor 28 and the drive shaft 22 can be used.

In a typical situation, the drive motor 22 has a horsepower rating of between 2 and 5 horsepower preferably in the order of 4 horsepower, and the motor is of a type to accelerate and decelerate rapidly under load to cause rapid change of direction of rotation of the table rolls 16a. The shell portion 30 of the table roll 16a is secured to the drive shaft 22 by means of a pair of diametrically opposed pins 31 and 32, it being understood that more or less than two pins are sometimes used to fasten the shell 30 to the drive shaft 22. However, no matter how many pins are used, the deficiency in this type of fastening ultimately causes loosening of the pins with respect to their holes as a result of the acceleration and deceleration, and continued use causes worsening of the condition until premature failure of the table roll occurs, this being somewhat caused by steel working against iron.

In accordance with the present invention this problem is completely eliminated and a table roll shell is maintained securely fastened to its associated drive shaft for the entire usable life of the shell only at which time it then becomes necessary for replacement of the roll shell.

The present invention is best illustrated in FIGS. 3, 4, 5, and 6, wherein the hot strip run-out table roll is designated generally by reference numeral 16b. The present invention includes an outer shell 40 secured to a continuous drive shaft 41 which has one end 42 thereof arranged for free journaled rotation within the side rail of the conveyor table and a driven end 43 arranged for coupling to a suitable drive motor, such as the drive motor 28 of FIG. 2. Most advantageously, the outer shell 40 includes a pair of radially inwardly directed end wall portions 46 and 47, these end wall portions being referred to as burnt plates as they are cut from thick plates and then machined to size. The burnt plates 46 and 47 have apertures 46a and 47a, respectively, formed therein of different size to accommodate the different dimensions of the drive shaft 42 as seen on the drawings, that is, aperture 46a is of larger diamter than the aperture 47a so that the drive shaft can be inserted into the sleeve 40, from left to right during assembly. The fit between the apertures 46a and 47a and the respective diameter portions of the drive shaft is a friction fit to allow (axial) expansion of the shell during normal operations when elevated temperatures occur. For example, the temperature of the shell 40 may reach as high as 700°F during operation. This will cause elongation of the shell in the order of one-half inch, more or less, as a result of thermal expansion.

Formed in at least one of the end wall portions 46 and 47 is a plurality of openings 50, here being shown formed in the end wall portion 47, to allow heat expulsion from the interior of the table rolls 16b. Therefore, during operation when the hot ingot or metal mass passes over the table rolls, and heat buildup occurs between the internal wall surface of the shell and the continuous drive shaft 42, the heat buildup so formed can be expelled through the openings 50.

As seen more clearly in FIG. 6, the driven end 43 of the drive shaft 42 has formed thereon a non-circular rotational-restricting surface means 52, here being shown as formed of a pair of diametrically opposed flat sections 53 and 54. The non-circular rotational-restricting surface portions are positioned immediately adjacent the outer wall surface of the end wall portion 46 so that the collar 56, which has a conforming internal configuration 57, can be positioned over the flats and then welded in position on the end wall 46. This is best illustrated in FIGS. 3 and 4 wherein a circular weld joint 58 is formed about the periphery of the collar and in continuous relation with the end wall portion 46 to form a solid bond therebetween. As a result of the non-circular rotational-restricting means 52 and the correspondingly configured internal shape of the collar 56, relative rotation between the shell 40 and the drive shaft 42 is prohibited. Since the collar closely conforms to the configuration of the non-circular section 52, there is no chance of slippage between these two components and they will not work loose.

When the shell 40 is worn sufficiently at the outer surface thereof the shell is easily removed from the drive shaft 41 by cutting away the weld portion 58 and removing the collar 56 so that the shell can be axially moved off of the shaft. Therefore, the shell need only be replaced when the outer surface thereof is sufficiently worn rather than prematurely as a result of structural failure of the roller assembly.

FIG. 5 specifically illustrates the internal configuration 57 of the collar 56. The configuration 57 is formed of correspondingly shaped diametrically opposed flat wall portions 57a and 57b which embrace and circumscribe the non-circular rotational-restricting surface portion 52. When the collar 56 is welded, as mentioned above, it firmly locks the outer shell 40 to the drive shaft 42.

Accordingly, the present invention provides simple and efficient means of maintaining the outer working shell of a conveyor roller in working condition for a longer period of time, i.e., without premature failure of the working components thereof. Accordingly, many other configurations of the present invention may be incorporated without departing from the spirit and scope of the novel concepts disclosed and claimed herein.

The invention is claimed as follows:

1. A conveyor roller structure comprising: drive shaft means having one end thereof arranged to be journalled and the other end thereof arranged to be driven by drive means, roller sleeve means having end wall portions directed radially inwardly toward said drive shaft means, said end wall portions having apertures formed therein for receiving said drive shaft means, a non-circular rotational-restricting surface means formed on said drive shaft means to be positioned adjacent the axially outwardly located wall surface of one of said end wall portions, said non-circular rotational-restricting surface extending radially outwardly of said drive shaft means, a collar positioned over said drive shaft means to circumscribe said non-circular rotational-restricting surface means, said collar having an internal configuration firmly to engage said non-circular rotational-restricting surface means and a radially inwardly circular flange and means for securing said collar to said one of said wall portions to capture said non-circular rotational-restricting surface between said one end of said end wall portion and said radially inwardly circular flange, whereby relative rotational and axial movement between said drive shaft means and said roller sleeve means is prevented, and replacement of said roller sleeve means is accomplished by removing said collar.

2. The conveyor roller structure according to claim 1 wherein said non-circular rotational-restricting surface means is formed of a pair of diametrically opposed flat wall portions formed at the periphery of a circular section of said drive shaft means.

3. The conveyor roller structure according to claim 1 wherein at least one of said end wall portions of said roller sleeve means has a plurality of heat venting openings formed about the central aperture thereof for releasing heat buildup which occurs between said drive shaft means and the interior surface of said roller sleeve means.

4. The conveyor roller structure according to claim 1 wherein the apertures formed in said end wall portions to receive said drive shaft means are sized to be frictionally engaged with said drive shaft means to allow axial expansion of said roller sleeve means thereupon as the result of elevated temperatures which occur during operation.

5. The conveyor roller structure according to claim 1 wherein said means for securing said collar to said one of said wall portions comprises weld metal deposited about the periphery of said collar for weldably binding said collar to said one of said wall portions.

* * * * *